United States Patent [19]
Prentice et al.

[11] Patent Number: 5,903,125
[45] Date of Patent: May 11, 1999

[54] POSITIONING SYSTEM

[75] Inventors: Thomas C. Prentice, Westford, Mass.; Brian P. Prescott, Fremont, N.H.

[73] Assignee: Speedline Technologies, Inc., Franklin, Mass.

[21] Appl. No.: 08/796,236

[22] Filed: Feb. 6, 1997

[51] Int. Cl.$^6$ .............................. B23Q 3/18; G05D 3/12
[52] U.S. Cl. ................. 318/625; 33/1 M; 74/471 XY; 414/744.4
[58] Field of Search .................. 318/625, 649, 318/687; 74/471 XY; 33/1 M; 108/51.1; 269/55, 71; 414/744.1, 744.2, 744.4

[56]  References Cited

U.S. PATENT DOCUMENTS

| | | | |
|---|---|---|---|
| 4,176,455 | 12/1979 | Copeland et al. | 33/1 |
| 4,835,710 | 5/1989 | Schnelle et al. | |
| 4,838,515 | 6/1989 | Prentice . | |
| 4,979,093 | 12/1990 | Laine et al. | |
| 5,092,021 | 3/1992 | Buzzi . | |
| 5,097,577 | 3/1992 | Buzzi et al. | |
| 5,213,559 | 5/1993 | Lunazzi . | |
| 5,378,282 | 1/1995 | Pollard | 118/697 |
| 5,486,151 | 1/1996 | Bergmann et al. | |
| 5,807,044 | 9/1998 | Watari et al. | |

FOREIGN PATENT DOCUMENTS

| | | |
|---|---|---|
| 0 508 130 A1 | 10/1992 | European Pat. Off. . |
| 0 700 733 A1 | 3/1996 | European Pat. Off. . |
| 2 398 937 | 2/1979 | France . |
| 2 621 715 | 4/1989 | France . |
| 42 34 675 A1 | 4/1993 | Germany . |

OTHER PUBLICATIONS

Ing, et al. "The Hexapod Principle" Laboratory for Machine Tools and Production Engineering at Aachen University of Technology, Germany.

Hexel Corporation brochure "Hexel's Hexapod Solutions", Porstmouth, NH. 03801.

Cooke, Arthur, et al. Advanced reconfigurable machine for flexible fabrication. *1995 North AmericanConference on Smart Structures and Materials*, San Diego, CA, Feb. 26–Mar. 3, 1996.

*Primary Examiner*—Bentsu Ro
*Attorney, Agent, or Firm*—Mintz, Levin, Cohn, Ferris, Glovsky and Popeo, P.C.

[57]  ABSTRACT

A positioning system for moving a device over an xy-plane has a drive mechanism with pivotable arms for moving a carriage over the xy-plane by driving it from one side. This drive mechanism allows the system to be made narrow along the other side.

13 Claims, 4 Drawing Sheets

POSITIONING SYSTEM

BACKGROUND OF THE INVENTION

This invention relates to a positioning system, and particularly to a system for positioning equipment, such as a liquid dispenser, with high precision over at least a two dimensional plane.

Coordinate positioning systems are used to carry instruments along two or three orthogonal axes to desired locations to perform some task, such as liquid dispensing, measuring, or milling. While a number of devices use such a positioning system, the system of the present invention is described for use with a liquid dispensing system that dispenses small quantities of liquid, such as dots of epoxy or an encapsulating liquid, on a printed circuit board.

FIG. 1 is a general representation of a known positioning device 10 for moving a carriage 12 that holds a liquid dispensing device 14 over a workpiece 15. Device 10 has a gantry 16 that is moved with a first motor 18 along a y-axis. Gantry 16 has a horizontal beam 20 along which a second motor 22 moves carriage 12 along an x-axis. Dispensing device 14 is moved along a vertical z-axis with a third motor 24. Movement along any or all of these axes can be accomplished with a lead screw as shown here, with a belt drive, or with a rack and pinion. Note that FIG. 1 is merely a general representation for illustrative purposes, but many other configurations for this general type of positioning device have been used; for example, a vertical beam can be moved along the x-axis, while the vertical beam supports a separate horizontal beam that is movable relative to the vertical beam.

For a given device with a positioning system, the device has a total area that the device takes up (a "footprint"), and a workable area, defined here in the xy-plane, over which the device operates on workpieces 15. To work in this workable area along the x and y axes, the device needs additional space along the x and y axes to accommodate motors and beams, bearings sufficient to hold the carriage firmly, and any other needed components. In a typical system, it is not uncommon along the x-axis for the working area W to be no more than 70% of the total width T of the device (note that FIG. 1 is not to scale). With the increasing expense of manufacturing floor space, particularly in clean room environments, it would be desirable to be able to reduce the amount of space that is needed to operate in a given work area, i.e., to reduce the footprint and thereby increase W/T along at least one axis.

SUMMARY OF THE INVENTION

The present invention includes a positioning system for moving a device at least in a plane, defined here by orthogonal x and y axes. A carriage system can be mounted for movement along x and y axes, preferably with drive mechanisms operated along one axis to create movement in the xy-plane.

In a preferred embodiment, the system has a frame, such as a platform or rails, a plate slidably mounted to the frame to move along a first axis, and a carriage slidably mounted to the plate for movement along a second axis perpendicular to the first axis. The system has two blocks, preferably spaced apart for stability, with each block being separately movable along the first axis, and with each block having a rigid arm pivotally connected to the block at one end of the arm and pivotally connected to the carriage at another end of the arm. Each block is separately driven along one axis, e.g., with a lead screw or a belt drive, to cause the carriage to move relative to the plate and thereby to cause the arms to push or pull the carriage along the second axis and the plate along the first axis.

The system of the present invention can be used with a number of different instruments, including a liquid dispensing device that is movable along a third axis mutually orthogonal to the first and second axes.

Because the drive mechanisms are both mounted to operate along the first axis, the device can be made very narrow relative to the working area along the second axis, such that the ratio of the width of the working area to the total width of the device can be as much as 90%. With motors mounted along one axis and on one side, a y-axis mechanism need not carry or support an x-axis motor and need not include an x-axis driving mechanism as in prior devices; this structure thus avoids use of an x-axis driving mechanism that can create heat and add mass to the moving plate, either of which can adversely affect performance (compare to FIG. 1), and further simplifies the system because there is no requirement to carry x-axis cables and/or belts. The present invention provides these benefits while also maintaining good stability because the movable blocks are spaced apart at ends along the x-axis. Another benefit is that the motors, on average, each carry 50% of the load, and therefore can be evenly matched. Other features and advantages will become apparent from the following detailed description, drawings, and claims.

DETAILED DESCRIPTION

Figure 1:
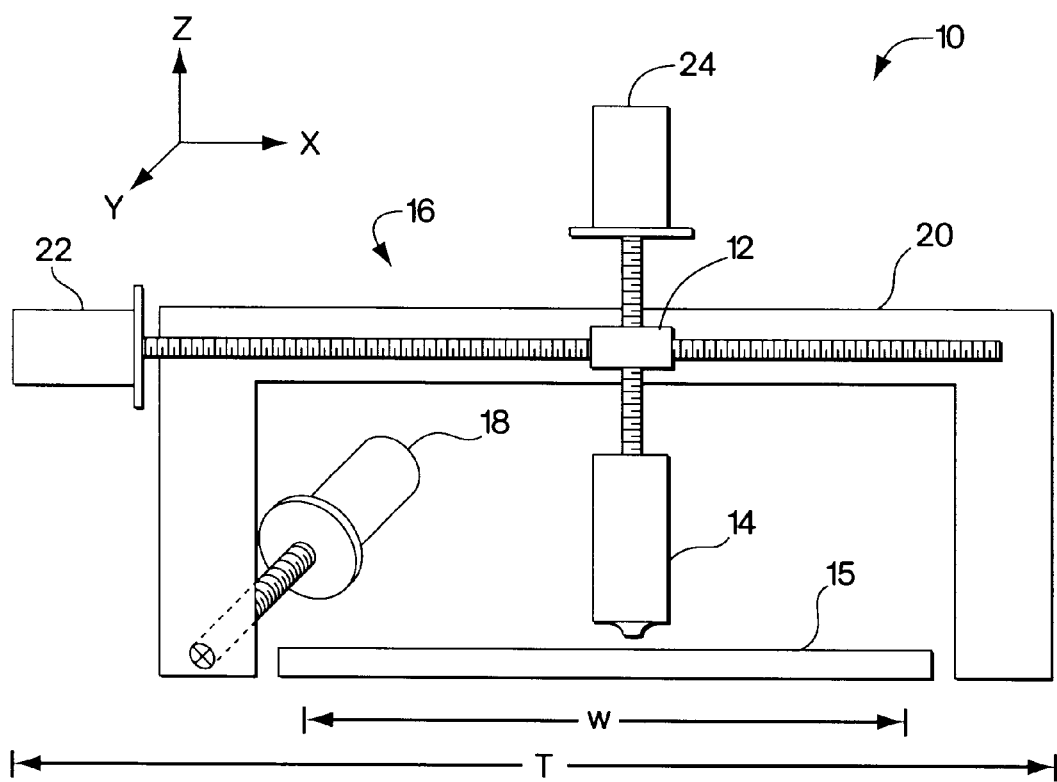
FIG. 1 is a pictorial side view of a known type of positioning system.
Figure 2:
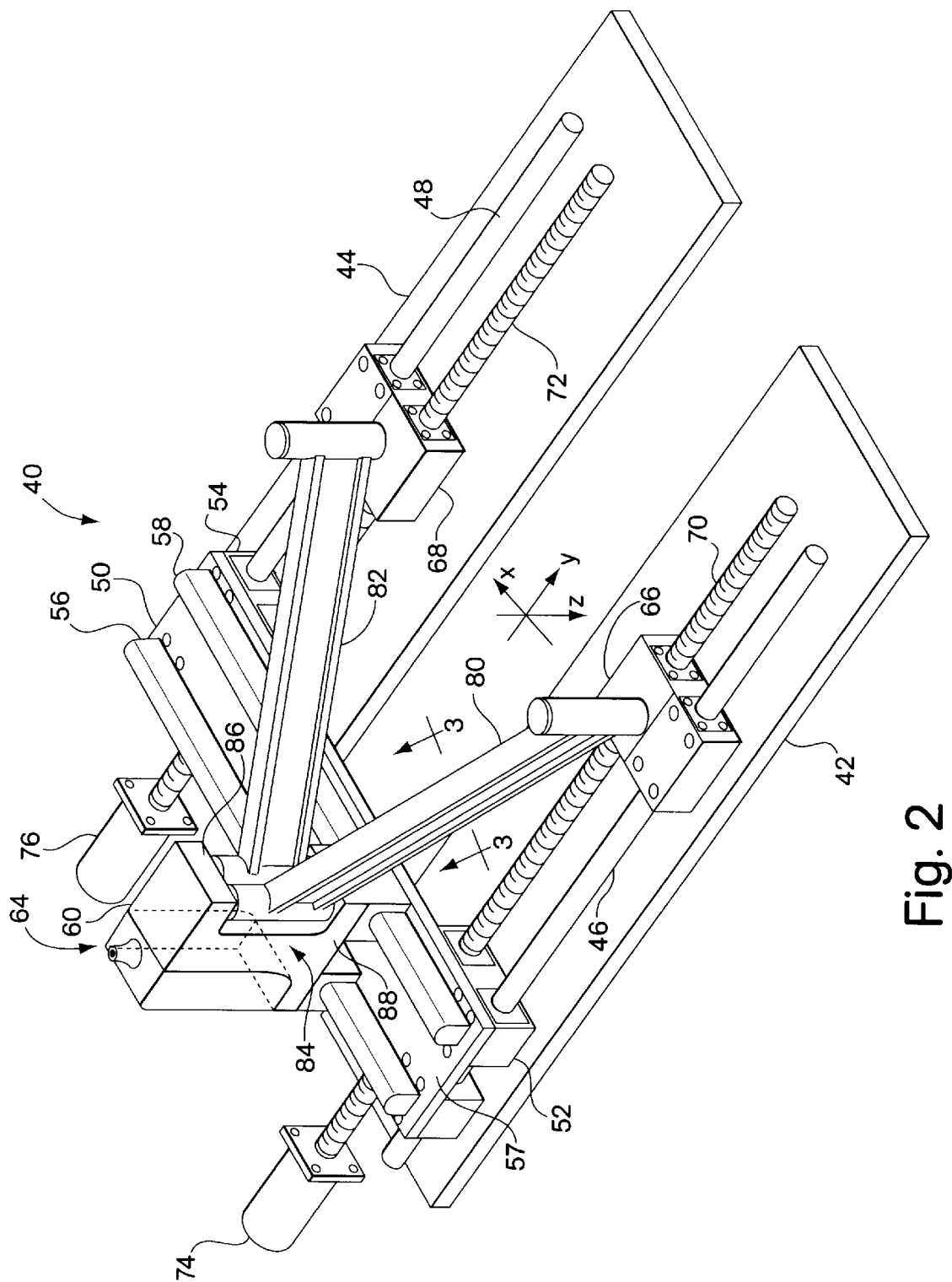
FIG. 2 is a perspective view of a positioning system according to an embodiment of the present invention.

FIG. 2 is a perspective view of a positioning system 40 according to the present invention (shown upside-down to better illustrate the components). Positioning system 40 has a first rail 42 and a parallel second rail 44 with respective first and second elongated bearings 46, 48 oriented in parallel along a y-axis and spaced apart along the perpendicular x-axis. Extending across the first and second rails 42, 44 is a plate 50 that is slidably mounted to rails 42, 44 and movable along bearings 46, 48 with blocks 52, 54 rigidly mounted at each end of plate 50.

Plate 50 has two elongated bearings 56, 58 extending in parallel along the x-axis and on a side 57 of plate 50 that faces away from rails 42, 44. A carriage 60 is slidably mounted to plate 50 for movement over bearings 56, 58 along the x-axis. Carriage 60 supports a mechanism for performing work on a workpiece, such as a liquid dispenser 64 movable along the z-axis with a motor and a belt or a lead screw (not shown) for dispensing liquid on a printed circuit board.

First and second driven nut blocks 66, 68 are mounted over rails 42, 44 and are slidably movable along the y-axis over bearings 46, 48. Each nut block 66, 68 can be separately driven with respective lead screws 70, 72 and motors 74, 76.

Carriage 60 is connected to each nut block 66, 68 with respective rigid trailing arms 80, 82 that are pivotally connected at one end to one of the nut blocks and pivotally connected at another end to carriage 60. To make these pivotal connections to carriage 60, the carriage has a C-shaped end 84 with two vertically oriented bearings extending from a top portion 86 to a bottom portion 88 of end 84. Each nut block also has a vertically oriented bearing for pivotal connection to one of the trailing arms. The trailing arms are secured to the bearings on the nut blocks. These bearings, and the others described above, are preferably pre-loaded and are mounted under compression so that there is substantially no unwanted relative movement in any direction.

Figure 3:
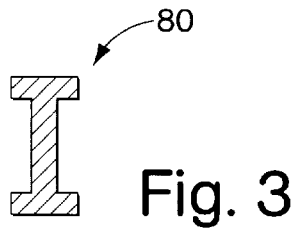
FIG. 3 is a cross-sectional view of a trailing arm taken through section lines 3—3 of FIG. 2.

Referring to FIG. 3, trailing arms 80, 82 are preferably shaped as vertically oriented I-beams to resist deflections along the z-axis. Trailing arms 80, 82, and also plate 50 and carriage 60, should be made of a light-weight and stiff material, such as aluminum, titanium, or magnesium.

Figure 4:
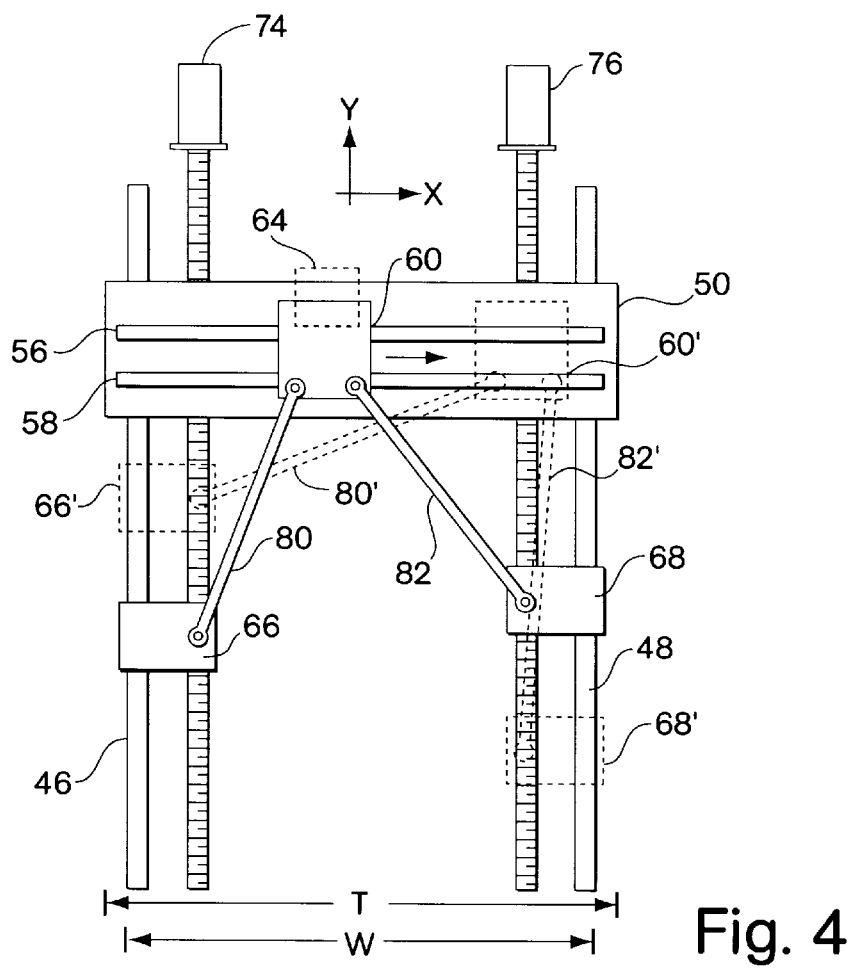
FIG. 4 is a plan view illustrating movement of the positioning system

Referring to FIG. 4, an example of movement by carriage 60 along the x-axis with only y-axis movements of the drive mechanisms is illustrated. In an initial position, carriage 60 is shown slightly left of center on movable block 50, and first nut block 66 on the left side is spaced slightly further from plate 50 along the y-axis than is second nut block 68. To move carriage 60 to a position 60' on the right hand side of movable plate 50, first nut block 66 is drawn closer to movable plate 50 to a position 66' and second nut block 68 is moved further away from plate 50 to a position 68', and therefore trailing arms 80, 82 move to positions 80' and 82'. These movements cause the carriage to have x-axis movement. As indicated here, the trailing arms can move over a range of angles relative to the x and y axes, and the combination of these varying angled movements can be used for controllable two-dimensional movement.

It should be apparent that y-axis movement of plate 50 (and hence carriage 60) can be achieved by moving nut blocks 66, 68 an equal amount at the same time along the y-axis. Moreover, the x-axis movement can be combined with y-axis movement by appropriately moving the first and second nut blocks. For example, if each block is moved in the same direction with one block being moved a little more than the other, the carriage will have y-axis movement and also some x-axis movement; or if one block is moved and the other is not, there will be both x-axis and y-axis movement. While the movement in the system according to the present invention is more complex than prior systems because the movement is non-linear, such movement can be programmed and then calculated with a processor using standard trigonometric calculations.

FIG. 4 also illustrates an important advantage of the system according to the present invention. As shown here, the total width T of the system is not much wider than the width of the working area W, such that a ratio W/T can be as much as 90%. In theory the x-axis width T need only exceed working area W by an amount equal to about one-half the width of carriage 60 on each side.

Figure 5:
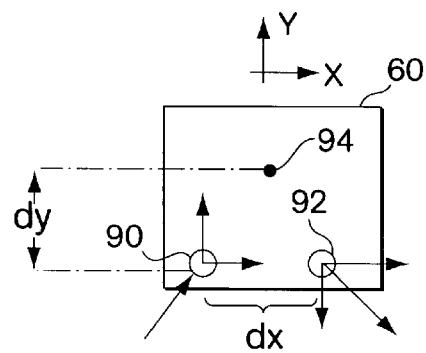
FIG. 5 is a plan view of the carriage, illustrating forces on the carriage during operation.

Referring to FIG. 5, while both arms could be connected to a single pivot point, e.g., with a knuckling arrangement, it is more desirable to have two spaced points 90, 92 to reduce yaw motion. Assuming a rightward movement by carriage 60 as shown in FIG. 4, a force will be directed at an angle into first point 90 and will be directed at an angle away from second pivot point 92. If the movement is solely along the x-axis, the net magnitude of the y-components of the vectors should cancel out, leaving only an x-component, but nonetheless causing a clockwise moment because pivot points 90, 92 are spaced apart. If a center of gravity 94 of carriage 60 is spaced from pivot points 90, 92, a counter-clockwise rotational moment is introduced with the rightward movement of the carriage. The distance dx between the pivot points and the distance dy between pivot points 90, 92 and center of gravity 94 can be optimized with mathematical calculations; the optimization can be performed in one of a number of different ways, e.g., so that the average clockwise and counter-clockwise moments are minimized over a given range of motion, or to minimize the net peak moment for the entire range of motion of carriage 60. This arrangement reduces yaw, while the orientations of the stiff trailing arms reduce pitch and roll in the carriage.

Figure 6:
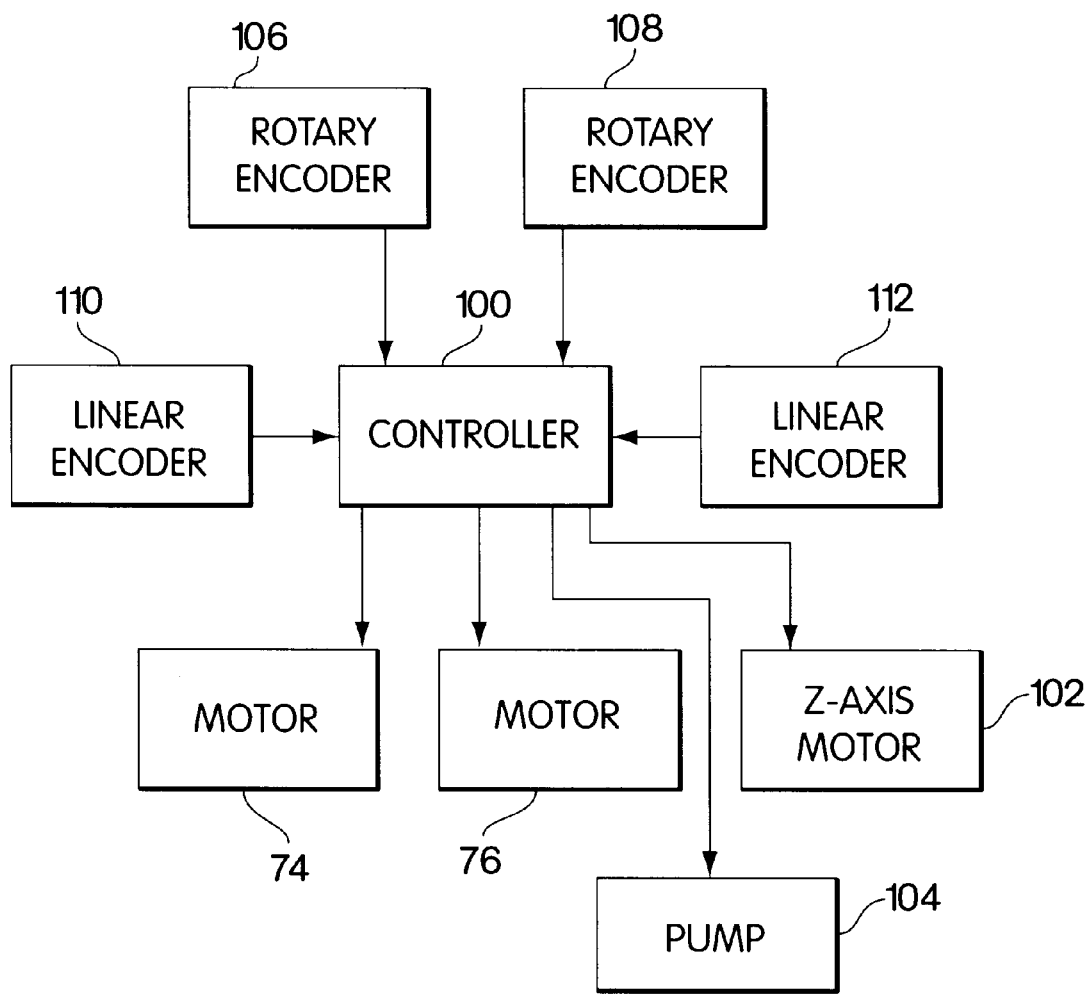
FIG. 6 is a block diagram of a control system.

Referring to FIG. 6, a programmable controller 100 controls the functions of the system. Controller 100 provides signals to motors 74, 76 to cause the motors to move the nut blocks as indicated in FIG. 4; controls a z-axis motor 102 to cause the motor to move vertically along the z-axis along with a pump 104 for dispensing liquid; and controls pump 104 to dispense liquid as desired.

To determine the position of plate 50 and carriage 60 at a given time in the xy-plane, controller 100 receives signals from rotary encoders 106, 108 and from linear encoders 110, 112. Each rotary encoder is mounted in one of motors 74, 76 and provides data to the controller based on the amount of rotation, thus translating into y-axis movement by the nut blocks. One of the linear encoders is mounted along the y-axis to sense y-axis movement and position of plate 50, and the other linear encoder is mounted on plate 50 to sense movement and position of carriage 60 relative to plate 50 along the x-axis. Using such encoders to provide feedback to control motors is well known in the field of servo motor control. In servo control terms, the linear encoders are used to close the positional loop, while the rotary encoders are used to close the velocity loop.

In a particular example of the use of such a system, a liquid dispenser is used to dispense liquid on printed circuit boards for one of a number of purposes, such as to dispense small dots of epoxy liquid on the circuit board, after which a component placement machine provides components over the epoxy; to provide an encapsulating material over a die on a circuit board for chip-on-board mounting; or to dispensing a liquid underfill material around an electronic component spaced slightly from a circuit board for wicking under the component. The types of material used and the methods of operation are different for these dispensing applications, and therefore different dispensers would be used for performing these different functions, but all of these could be performed with this positioning system.

In one example, a number of circuit boards are processed so that dots of liquid are dispensed. The locations for the dots are entered into the system and provided to the controller. The controller uses an optimizing function to decide the order in which the dots are to be dispensed, typically to reduce the amount of travel of the dispenser in the xy-plane. Boards are brought to the system with a conveyor system. For each dot to be dispensed, the controller moves the carriage and pump to a desired location in the xy-plane, activates the z-axis motor to lower the pump to the circuit board, activates the pump to cause the pump to dispense a small quantity of liquid at that location, and causes the z-axis motor to move away from the circuit board. The carriage is then moved to another position in the xy-plane. These steps of moving the device in the xy-plane and along the z-axis in an optimized manner are generally known. The difference with the system of the present invention is that the locations for the dots are converted to movements by the two motors operating along the same direction.

Having described an embodiment of the present invention, it should be apparent that modifications can be made without departing from the scope of the present invention. For example, while the system here has been described as being mounted on rails, it could also be mounted on another type of frame, such as a solid platform; while the drive for the nut blocks has been shown as a drive screw, a motor and belt could be used if desired; the carriage mounted on the movable block is shown moving along two bearings, although only one bearing may be necessary. While a rotary encoder has been mentioned above for use in determining rotary position, other rotary position sensors, such as resolvers, could be used.

What is claimed is:

1. An apparatus for positioning a work-performing instrument, the apparatus comprising:
    a frame;
    a carriage system for holding the instrument the carriage system being mounted for movement in a plane relative to the frame;
    a first arm having a first end pivotally connected to the carriage system;
    a second arm having a first end pivotally connected to the carriage system; and
    first and second drivers connected to second ends of the respective first and second arms for moving the first and second arms over a range of angles to move the carriage system over the plane;
    wherein the first and second drivers are constructed to move the second ends of the arms along parallel paths along one axis.

2. A system for positioning an instrument for performing a task, the system comprising:
    a frame;
    a plate mounted to the frame for movement along a first axis relative to the frame;
    a carriage for holding the instrument and mounted to the plate for movement relative to the plate along a second axis perpendicular to the first axis;
    a first block and a second block each mounted to the frame and spaced apart along the second axis, each block being movable relative to the frame along the first axis;
    a first rigid arm pivotally connected to the first block and pivotally connected to the carriage;
    a second rigid arm pivotally connected to the second block and pivotally connected to the carriage; and
    a first and second drive mechanisms separately operable for moving the respective first and second blocks along the first axis such that the carriage is movable over a plane defined by the first and second axes:
    wherein the first and second drive mechanisms each includes a motor and a lead screw.

3. A system for positioning an instrument for performing a task, the system comprising:
    a frame;
    a plate mounted to the frame for movement along a first axis relative to the frame;
    a carriage for holding the instrument and mounted to the plate for movement relative to the plate along a second axis perpendicular to the first axis;
    a first block and a second block, each mounted to the frame and spaced apart along the second axis, each block being movable relative to the frame along the first axis;
    a first rigid arm pivotally connected to the first block and pivotally connected to the carriage;
    a second rigid arm pivotally connected to the second block and pivotally connected to the carriage; and
    a first and second drive mechanisms separately operable for moving the respective first and second blocks along the first axis such that the carriage is movable over a plane defined by the first and second axes;
    wherein the first and second drive mechanisms each include a motor and a belt drive.

4. A system for positioning an instrument for performing a task, the system comprising:
    a frame;
    a plate mounted to the frame for movement along a first axis relative to the frame;
    a carriage for holding the instrument and mounted to the plate for movement relative to the plate along a second axis perpendicular to the first axis;
    a first block and a second block, each mounted to the frame and spaced apart along the second axis, each block being movable relative to the frame along the first axis;
    a first rigid arm pivotally connected to the first block and pivotally connected to the carriage;
    a second rigid arm pivotally connected to the second block and pivotally connected to the carriage; and
    a first and second drive mechanisms separately operable for moving the respective first and second blocks along the first axis such that the carriage is movable over a plane defined by the first and second axes;
    wherein the first and second drive mechanisms each includes a motor, the system further comprising first and second respective rotary position sensors for sensing rotary motion of the motor.

5. The system of claim 4, further comprising a first linear position sensor mounted to the frame for sensing linear movement of the plate relative to the frame along the first axis, and a second linear position sensor mounted to the plate for sense movement of the carriage relative to the plate along the second axis.

6. The system of claim 5, further comprising a controller for receiving signals from the rotary position sensors and from the linear position sensors and for using the information from the position sensors to provide control signals to control operation of the motors.

7. A system for positioning an instrument for performing a task, the system comprising:
    a frame;
    a plate mounted to the frame for movement along a first axis relative to the frame;
    a carriage for holding the instrument and mounted to the plate for movement relative to the plate along a second axis perpendicular to the first axis;
    a first block and a second block, each mounted to the frame and spaced apart along the second axis, each block being movable relative to the frame along the first axis;
    a first rigid arm pivotally connected to the first block and pivotally connected to the carriage;
    a second rigid arm pivotally connected to the second block and pivotally connected to the carriage; and
    a first and second drive mechanisms separately operable for moving the respective first and second blocks along the first axis such that the carriage is movable over a plane defined by the first and second axes;
    wherein the frame includes two parallel rails.

8. A system for positioning an instrument for performing a task, the system comprising:

a frame;

a plate mounted to the frame for movement along a first axis relative to the frame;

a carriage for holding the instrument and mounted to the plate for movement relative to the plate along a second axis perpendicular to the first axis;

a first block and a second block, each mounted to the frame and spaced apart along the second axis, each block being movable relative to the frame along the first axis;

a first rigid arm pivotally connected to the first block and pivotally connected to the carriage;

a second rigid arm pivotally connected to the second block and pivotally connected to the carriage; and a first and second drive mechanisms separately operable for moving the respective first and second blocks along the first axis such that the carriage is movable over a plane defined by the first and second axes;

wherein the first and second rigid arms are pivotally connected to the carriage at separate pivot points at the same location along the first axis, but spaced apart along the second axis.

9. A system for positioning an instrument for performing a task, the system comprising:

a frame;

a plate mounted to the frame for movement along a first axis relative to the frame;

a carriage for holding the instrument and mounted to the plate for movement relative to the plate along a second axis perpendicular to the first axis;

a first block and a second block, each mounted to the frame and spaced apart along the second axis, each block being movable relative to the frame along the first axis;

a first rigid arm pivotally connected to the first block and pivotally connected to the carriage;

a second rigid arm pivotally connected to the second block and pivotally connected to the carriage; and a first and second drive mechanisms separately operable for moving the respective first and second blocks along the first axis such that the carriage is movable over a plane defined by the first and second axes:

wherein the instrument includes a liquid dispensing pump that is movable along a third axis perpendicular to the first and second axes.

10. An apparatus for positioning a work-performing instrument, the apparatus comprising:

a frame, a carriage system for holding the instrument, the carriage being mounted for movement in a plane relative to the frame;

a first arm having a first end pivotally connected to the carriage system;

a second arm having a first end pivotally connected to the carriage system; and first and second drivers connected to second ends of the respective first and second arms for moving the first and second arms over a range of angles to move the carriage system over the plane;

wherein the carriage system includes a plate mounted to the frame for movement along a first axis relative to the frame, and a carriage mounted to the plate for movement along a second axis relative to the plate, the second axis being perpendicular to the first axis and with the first axis defining the plane over which the carriage system moves.

11. The apparatus of claim 10, wherein the first and second drivers are each mounted to one side and are operable along the first axis.

12. The apparatus of claim 10, wherein each of the first and second drivers includes a motor and a lead screw.

13. The apparatus of claim 10, wherein each of the first and second drivers includes a motor and a belt drive.

* * * * *